United States Patent
Lin et al.

(10) Patent No.: US 10,102,973 B2
(45) Date of Patent: Oct. 16, 2018

(54) GRAPHENE ELECTRODE BASED CERAMIC CAPACITOR

(71) Applicant: Nanotek Instruments, Inc., Dayton, OH (US)

(72) Inventors: Yi-jun Lin, Taoyuan (TW); Bor Z Jang, Centerville, OH (US); Shaio-Yen Lee, Taipei (TW); Aruna Zhamu, Springboro, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 706 days.

(21) Appl. No.: 14/121,487

(22) Filed: Sep. 12, 2014

(65) Prior Publication Data

US 2016/0079001 A1  Mar. 17, 2016

(51) Int. Cl.
  *H01G 4/005* (2006.01)
  *H01G 4/228* (2006.01)
  (Continued)

(52) U.S. Cl.
  CPC .............. *H01G 4/008* (2013.01); *B32B 18/00* (2013.01); *C01B 31/0438* (2013.01); *C04B 35/4682* (2013.01); *C04B 35/6261* (2013.01); *C04B 35/62675* (2013.01); *C04B 35/62685* (2013.01); *C04B 35/62695* (2013.01); *C04B 35/634* (2013.01); *C04B 35/638* (2013.01); *H01G 4/1227* (2013.01); *H01G 4/1245* (2013.01);
  (Continued)

(58) Field of Classification Search
  CPC ........ H01G 4/30; H01G 4/008; H01G 4/1227; H01G 4/1254; H01G 4/1245; H01G 4/228

USPC ............ 361/321.1, 321.2, 321.3, 301.4, 303, 361/306.1
See application file for complete search history.

(56) References Cited

U.S. PATENT DOCUMENTS

| | | | |
|---|---|---|---|
| 5,177,663 A * | 1/1993 | Ingleson | H01G 4/30 361/321.2 |
| 6,043,973 A | 3/2000 | Nagashima et al. | |

(Continued)

OTHER PUBLICATIONS

U.S. Appl. No. 10/858,814, filed Jun. 3, 2004, B. Z. Jang, et al.
(Continued)

*Primary Examiner* — Eric Thomas
*Assistant Examiner* — Arun Ramaswamy

(57) ABSTRACT

A ceramic capacitor comprising at least a dielectric ceramic layer and at least a graphene electrode layer deposited on the ceramic layer, wherein the graphene electrode layer has a thickness no less than 2 nm and consists of a graphene material or a graphene composite material containing at least 0.1% by weight of a graphene material dispersed in a matrix material or bonded by a binder material, wherein the graphene material is selected from (a) a plurality of single-layer or multi-layer pristine graphene sheets having less than 0.01% by weight of non-carbon elements, or (b) one or a plurality of a non-pristine graphene material having at least 0.01% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

17 Claims, 6 Drawing Sheets

(A)

(B)

(51) Int. Cl.
   *H01G 4/30* (2006.01)
   *H01G 4/06* (2006.01)
   *H01G 4/008* (2006.01)
   *H01G 4/12* (2006.01)
   *C01B 31/04* (2006.01)
   *B32B 18/00* (2006.01)
   *C04B 35/468* (2006.01)
   *C04B 35/626* (2006.01)
   *C04B 35/634* (2006.01)
   *C04B 35/638* (2006.01)

(52) U.S. Cl.
   CPC ... *H01G 4/1254* (2013.01); *C04B 2235/3215* (2013.01); *C04B 2235/3217* (2013.01); *C04B 2235/3224* (2013.01); *C04B 2235/3227* (2013.01); *C04B 2235/3236* (2013.01); *C04B 2235/3244* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/442* (2013.01); *C04B 2235/6025* (2013.01); *C04B 2235/6582* (2013.01); *C04B 2235/79* (2013.01); *C04B 2237/346* (2013.01); *C04B 2237/68* (2013.01); *C04B 2237/704* (2013.01)

(56) References Cited

U.S. PATENT DOCUMENTS

| | | |
|---|---|---|
| 6,326,052 B1 | 12/2001 | Nagashima et al. |
| 6,777,109 B2 | 8/2004 | Kimoto et al. |
| 7,071,258 B1 | 7/2006 | Jang et al. |
| 2005/0271574 A1 | 12/2005 | Jang et al. |
| 2008/0048152 A1 | 2/2008 | Jang et al. |
| 2010/0008019 A1* | 1/2010 | Burn .................... C04B 35/465 361/321.4 |
| 2013/0038980 A1* | 2/2013 | Kim .................... H01G 4/0085 361/301.4 |

OTHER PUBLICATIONS

U.S. Appl. No. 11/509,424, filed Aug. 25, 2006, B. Z. Jang, et al.

* cited by examiner

GRAPHENE ELECTRODE BASED CERAMIC CAPACITOR

FIELD OF THE INVENTION

The present invention relates generally to the field of ceramic capacitor and, more particularly, to the ceramic capacitor containing a graphene-based material (instead of metal) as the primary electrode material. It may be noted that the ceramic capacitor is unrelated to the supercapacitor (also known as ultracapacitor or electrochemical capacitor) or the electrolytic capacitor. These three (ceramic capacitor, supercapacitor, and electrolytic capacitor) are fundamentally different and patently distinct classes of electronic devices.

BACKGROUND OF THE INVENTION

A ceramic capacitor, also referred to as a dielectric ceramic, is a capacitor in which a ceramic material acts as the dielectric and a metal as the electrode. Typically, a ceramic capacitor is constructed of two or more alternating layers of ceramic dielectric and metal. The composition of the ceramic material governs the electrical behaviors and, hence, applications of the resulting ceramic capacitor. Ceramic capacitors are commonly divided into two application classes: Class 1 ceramic capacitors offer high stability and low losses for resonant circuit applications and Class 2 ceramic capacitors offer high volume efficiency for buffer, by-pass and coupling applications.

The two major groups of ceramic materials utilized for ceramic capacitors are paraelectric (e.g. titanium dioxide) and ferroelectric material (e.g. barium titanate). A typical ceramic material as the dielectric phase is a mixture of a paraelectric material with an additive, a ferroelectric material with an additive, or a paraelectric material with a ferroelectric material. A paraelectric material-containing mixture can lead to a ceramic capacitor having a very stable and linear behavior of the capacitance value within a specified temperature range and low losses at high frequencies. However, titanium dioxide mixtures have a relatively low permittivity, implying that the capacitance value of the resulting capacitor is relatively small. Higher capacitance values for ceramic capacitors can be attained by using mixtures of ferroelectric materials, such as barium titanate, together with other metal oxides. These dielectric materials have much higher permittivity values, but their capacitance values are largely nonlinear over the temperature range, and losses at high frequencies are much higher. These different electrical characteristics of ceramic capacitors serve as bases for grouping them into "application classes".

The dielectric material in a ceramic capacitor is typically composed of a mixture of finely ground particles of paraelectric or ferroelectric materials with other materials to achieve the desired characteristics. These powder mixtures are sintered at high temperatures to obtain the dielectric ceramic. The ceramic forms the dielectric (hence, the term dielectric ceramic), which serves as a substrate for the metallic electrodes. In the commercially available ceramic capacitors, the minimum thickness of the dielectric layer for low voltage capacitors is in the size range of 0.5 µm due to the usually large grain sizes of the ceramic powder. The thickness of the dielectric for capacitors with higher voltages is determined by the dielectric strength of the desired capacitor.

Commonly used ceramic capacitors come in various shapes and styles, including: (a) multilayer ceramic chip capacitor (MLCC), typically a rectangular block, for surface mounting; (b) ceramic disc capacitor (typically a single layer disc that is resin-coated, with through-hole leads); (c) feedthrough ceramic capacitor, used for bypass purposes in high-frequency circuits (e.g. tube shape, inner metallization contacted with a lead, outer metallization for soldering); (d) ceramic power capacitors, larger ceramic bodies in different shapes for high voltage applications.

An MLCC can be composed of a number of individual capacitors stacked together in parallel, which are contacted via the terminal surfaces. In other words, each MLCC includes a stack of internal planar electrodes arranged in parallel fashion with a ceramic layer there between, wherein the internal planar electrodes are of alternate polarity. External terminals, defined to be cathode or anode, are each in electrical contact with alternate internal electrodes.

Ceramic disc capacitors are commonly used for suppressing electromagnetic interference/radio frequency interference (EMI/RFI); e.g. for safety standard classes X1/Y2. Mainly due to their nonflammability in case of short circuit and their compatibility against high peak over-voltages (transient voltage), ceramic capacitors are often used as AC line filters for EMI or RFI suppression. These capacitors, also known as safety capacitors, are crucial components to reduce or suppress electrical noise caused by the operation of electrical or electronic equipment, while also providing limited protection against human endanger during short circuits.

Suppression capacitors are effective in reducing interference due to their electrical impedance decreasing with increasing frequency, so that at higher frequencies they short circuit electrical noise and transients between the lines, or ground. Hence, they can prevent equipment and devices (including motors, inverters, electronic ballasts, solid-state relay snubbers, and spark quenchers, etc.) from sending and receiving electromagnetic and radio frequency interference as well as transients in across-the-line (X capacitors) and line-to-ground (Y capacitors) connections. X capacitors effectively absorb symmetrical, balanced, or differential interference. Y capacitors are connected in a line bypass between a line phase and a point of zero potential, to absorb asymmetrical, unbalanced, or common-mode interference.

Large screen-size/high definition TVs and LCD displays are highly popular consumer electronic devices. Yet, smaller-sized computers (e.g. tablets) and telecommunications devices (smart phones) are becoming more popular. In both types of devices, a need exists for downsizing of the switching power supply circuits. Thus, the ceramic capacitors are required to be more compact and lighter in weight to meet the downsizing trends in the switching power supply circuits and the DC-DC converter circuits. In addition, the ceramic capacitors, among the key passive components used in these devices, are required to be able to operate under the operating conditions of higher frequency and higher voltage.

Additionally, the ceramic capacitors also have several other issues. For instance, the ceramic capacitor is typically composed of a disc-shape dielectric ceramic element assembly and an electrode is provided on both surfaces in the main area of the disc-shape dielectric ceramic element assembly. Each of the electrodes is connected with a connecting wire (or a lead), and the whole structure is covered by a protective coating or molding material. Silver (Ag) has long been used as the electrode material for ceramic capacitors. The Ag electrode, however, exhibits issues of substantial internal heat-generation and electro-migration. Silver is also extremely expensive.

Instead of Ag, electrodes made of a less expensive metal, such as copper (Cu) or nickel (Ni), is used among some ceramic capacitors. The electrodes made of Cu or other base metals are provided by baking in a neutral or reductive atmosphere to avoid possible oxidation. In order to prevent the dielectric ceramic element assembly from being reduced in the reductive atmosphere, several approaches have been proposed: improving the baking process and adding a certain additive to a composition of the dielectric ceramic element assembly. For instance, one may add an amount of MgO, CuO, CoO, and/or $CeO_2$ to mixtures of $SrTiO$, $PbTiO_3$, $Bi_2O_3$, and/or $TiO_2$. Then, an electrode made mainly of Cu is deposited and baked on the opposing surfaces of the ceramic dielectric element assembly.

However, the reductive atmosphere needs to be strictly controlled, which would lead to reduced productivity. Furthermore, should an oxidized base metal electrode actually occur, it not only affects the production yield rate but also significantly impairs the productivity over the total manufacturing process. This is because it is difficult to detect and identify this kind of defects with a non-destructive inspection process. Also, the addition of an additive to the dielectric ceramic material requires a highly stringent compositional control, which drives up the cost. Additionally, soldering between a lead wire and an electrode often presents a reliability issue.

Several attempts have been made to overcome the above-described drawbacks. For instance, in order to overcome the problems of poor soldering (between metal electrode and connecting wires) and diffusion of electrode/solder metal atoms into the dielectric layer (thereby weakening the wire-electrode bond and degrading dielectric layer performance), Nagashima, et al (U.S. Pat. No. 6,326,052, Dec. 4, 2001) proposed a complex and costly three-layer electrode structure with each layer having different metal compositions. Similarly, the U.S. Pat. No. 6,043,973 (issued on Mar. 27, 2000 to Nagashima, et al.) teaches a ceramic capacitor in which a three-layered electrode is provided by a dry plating method, the first layer of which being Zn. However, these approaches did not address the internal heat-generation problem, yet did significantly increase the production complexity and costs. Even with a highly sophisticated dielectric ceramic composition designed to reduce heat generation (e.g. as disclosed in U.S. Pat. No. 6,777,109, issued to M. Kimoto, et al on Aug. 17, 2004), a significant amount of heat is still generated anyway, particularly when the ceramic capacitor operates under high-frequency and/or high-voltage conditions for an extended period of time.

Thus, it was an object of the present invention to provide a ceramic capacitor electrode composition that exhibits one or more of the following characteristics: (a) reduced or eliminated electrode migration (e.g. diffusion of metal atoms into the dielectric ceramic structure or the interface zone between a lead wire and the metal electrode); (b) no or little metal oxidation of electrode; (c) good compatibility with soldering material and/or connecting wires; (d) simplified electrode compositions; (e) ease of electrode processing; (f) improved compatibility with the dielectric material; and (g) reduced or eliminated heat accumulation in the capacitor during operations.

SUMMARY OF THE INVENTION

The present invention provides a ceramic capacitor comprising at least a dielectric ceramic layer and at least a graphene- or exfoliated graphite-based electrode layer deposited on the ceramic layer. In other words, graphene or exfoliated graphite layers are used to replace metal electrodes (e.g. Ag, Ni, Cu, Zn, and Au electrodes in conventional ceramic capacitors). The presently invented ceramic capacitor does not contain a layer of neat metal or metal alloy electrode; any metal-based electrode contains discrete graphene sheets internally dispersed in the metal matrix or bonded by a metal binder.

The graphene electrode layer has a thickness no less than 2 nm (preferably no less than 10 nm) even though individual discrete graphene sheets (typically 0.3-10 μm wide/long) can have a thickness as thin as 0.34 nm (so-called single-layer graphene). This thickness requirement of no less than 2 nm is primarily for the purpose of achieving reasonable ease of handling, and this requirement essentially excludes all graphene films obtained by catalytic CVD. The catalytic CVD graphene (not containing discrete graphene sheets/platelets) is typically a monolithic film that is approximately 0.4-1.2 nm thick. The CVD-made, ultra-thin film is too difficult to handle. The CVD graphene film is typically deposited on a Cu/Ni surface and the graphene film must be detached from the Cu/Ni substrate (e.g. by chemically etching away Cu/Ni, an expensive, delicate, and environmentally non-benign procedure). Thus, the CVD graphene is also excluded from the scope of the instant invention.

The graphene electrode layer consists of a layer of graphene material alone (multiple graphene sheets/platelets being packed together into a paper-like or film-like structure) and/or a graphene composite material, and does not contain a separate metal layer as the electrode or as part of an electrode. The exfoliated graphite electrode consists of exfoliated graphite flakes or exfoliated graphite composite.

The graphene composite material preferably contains from 0.1% to 99% by weight (preferably at least 0.5%, further preferably at least 1%) of a graphene material selected from (a) a plurality of single-layer or multi-layer pristine graphene sheets (having less than 0.01% by weight of non-carbon elements) that are stacked or bonded together to form an electrode having a thickness of at least 2 nm (preferably at least 10 nm), or (b) one or a plurality of single-layer or multi-layer non-pristine graphene sheets having at least 0.01% by weight of non-carbon elements. The multi-layer pristine or non-pristine graphene sheets or platelets have a thickness less than 100 nm or have 2-300 graphene planes bonded together to form a sheet or platelet. The non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof. The non-carbon elements may include an element selected from oxygen, fluorine, chlorine, bromine, iodine, nitrogen, hydrogen, boron, or a combination thereof. The pristine or non-pristine materials, single-layer or multi-layer, are collectively referred to as nano graphene platelets (NGPs).

The exfoliated graphite electrode can contain discrete graphite flakes having a thickness from 100 nm to 1 μm (preferably <200 nm). The exfoliated graphite electrode can consist of an exfoliated graphite composite material composed of 0.1%-99% by weight (preferably at least 0.5% by weight) of discrete graphite flakes having a thickness from 100 nm to 1 μm that are bonded by a binder material or dispersed in a matrix material wherein the binder or matrix material is selected from a metal, carbon, graphite, polymer, pitch, glass, metal oxide, ceramic, organic material, or a combination thereof. Preferred binder or matrix materials are conducting polymers, carbon, and metals. However, with a sufficient amount (e.g. >5%, preferably >10% by weight) of a graphene material to make the resulting composite electrically conductive, the matrix or binder material itself does not have to be conductive.

The pristine or non-pristine graphene sheets may contain few-layer graphene sheets each having 1 to 10 graphene planes bonded together. In a preferred embodiment, the pristine or non-pristine graphene sheets contain multi-layer (multi-plane) graphene with each sheet having 10 to 100 graphene planes bonded together, or having a thickness from approximately 3.4 nm to 34 nm.

In one embodiment, the graphene electrode layer consists of a graphene material only (pristine, non-pristine, or a combination), and no other material is present. In this case, the graphene layer can be made directly into a monolithic graphene structure using, for instance, metal catalyzed chemical vapor deposition (CVD). However, metal-catalyzed CVD is excluded not just because it is a slow and expensive process, but also because it can only produce ultra-thin pristine graphene up to few graphene planes (<2 nm). Such an ultra-thin graphene sheet is not conducive to connecting wire (terminal) attachment and cannot be used as an electrode of an industry-scale ceramic capacitor. A thin film with a thickness <2 nm is very difficult to handle (e.g. to be transferred and attached to a dielectric layer).

Alternatively, the graphene electrode can be made into a layer of thin film or paper graphene using spraying (e.g. electrostatic spraying, ultrasonic spraying, compressed air-assisted spraying, etc.), printing (e.g. screen printing, inkjet printing, etc.), casting, coating, paper-making, etc. Multiple graphene sheets can be dispersed in a liquid medium to form a suspension or ink, which is then dispensed and deposited directly onto a surface of a dielectric ceramic layer. The suspension or ink is then dried, allowing discrete sheets of graphene material to adhere directly onto the dielectric ceramic layer.

One may also deposit the suspension or ink onto a solid substrate first, which is followed by drying to form a discrete graphene layer (paper or film) and optionally heat treated to improve the crystal structure and physical properties of the graphene film. A piece of such a graphene film or paper is then attached to a dielectric ceramic layer with or without using glue (thin adhesive coating between the graphene film/paper and the dielectric ceramic layer, prior to or after ceramic layer sintering).

In another embodiment, the graphene electrode comprises a graphene composite material comprising multiple discrete graphene sheets (typically 0.3-40 μm long/wide, but more typically 0.5-10 μm long/wide) dispersed in a matrix material or bonded by a binder material. In yet another embodiment, the exfoliated graphite electrode comprises an exfoliated graphite composite material comprising multiple graphite flakes (having a thickness >100 nm) dispersed in a matrix material or bonded by a binder material. The graphene composite material or exfoliated graphite composite material can contain a binder or matrix material selected from a metal, carbon, graphite, polymer, pitch, glass, metal oxide, ceramic, organic material, or a combination thereof. In a preferred embodiment, the binder or matrix material is an electrically conductive material selected from an intrinsically conductive polymer, a metal, carbon, pitch, or graphite material.

In a particularly desired embodiment, the graphene composite material or exfoliated graphite composite material contains from 0.1% to 50% (preferably <30%) by weight of a metal selected from Ag, Cu, Ni, Co, Mn, Fe, Zn, Sn, Pb, or a combination thereof, based on the total composite material weight. The composite material can contain a metal and an adhesive resin each of 0.1% to 30% by weight based on the total graphene or exfoliated graphite composite material weight.

There is no limitation as to how multiple sheets (or platelets) of a graphene material (or exfoliated graphite flakes) and a binder or matrix material (along with optional additives) are combined and consolidated. In one embodiment, multiple sheets of a graphene or exfoliated graphite material and a binder or matrix material (along with optional additives), initially all in a solid state, are properly blended to form a solid mixture. The mixture is then heated so that the binder or matrix material becomes a liquid or melt, which is then solidified or cured (hardened), optionally under a stress (e.g. pressure) or in a mold or tool. Alternatively, multiple sheets of a graphene material (along with optional additives) may be formed into a porous preform (e.g. a sheet of mat, paper, or foam), which is then infiltrated or impregnated with a binder or matrix material.

In the invented ceramic capacitor, the dielectric ceramic layer or element can contain a ferroelectric material, such as Barium titanate (BaTiO3), Colemanite, Europium barium titanate, Germanium telluride, Langbeinites, Lead scandium tantalate, Lead titanate, Lead zirconate titanate (PZT), Lead lanthanum zirconate titanate (PLZT), Lithium niobate, Potassium sodium tartrate, Potassium titanyl phosphate, Polyvinylidene fluoride (PVDF), a Ferroelectric polymer, or a combination thereof.

The dielectric ceramic layer or element can contain an additive selected from a paraelectric material, titanium dioxide ($TiO_2$), aluminum silicate, magnesium silicate, aluminum oxide, $MgNb_2O_6$, $ZnNb_2O_6$, $MgTa_2O_6$, $ZnTa_2O_6$, $(ZnMg)TiO_3$, $(ZrSn)TiO_4$, and $Ba_2Ti_9O_{20}$, a modifier (containing Zinc, Zirconium, Niobium, Magnesium, Tantalum, Cobalt, or Strontium), or a combination thereof.

The ceramic capacitor can be a ceramic disc capacitor, a multi-layer ceramic chip capacitor, a feed-through ceramic capacitor, or a ceramic power capacitor. Each capacitor has at least a graphene electrode. In a ceramic disc capacitor, preferably both electrodes are a graphene electrode. The multi-layer ceramic chip capacitor comprises a plurality of dielectric ceramic layers and a plurality of graphene electrode layers alternatingly stacked with one another.

There is no limitation with respect to the graphene electrode thickness. However, in all types of ceramic capacitors, the graphene electrode layer has a thickness preferably from 2 nm to 10 μm, more preferably from 5 nm to 1 μm, further preferably from 10 nm to 0.5 μm, and most preferably from 10 nm to 200 nm.

(B) Schematic of a graphene composite composed of discrete graphene sheets bonded by a binder material.

FIG. 4 (A) Temperature increase in the ceramic capacitors (Ag electrode and Ag-20% pristine graphene) caused by internal heat generation at various different applied voltage values; (B) Temperature increase in the ceramic capacitors as a function of the graphene material proportion for two capacitors, one featuring various loadings of pristine graphene and the other nitrogenated graphene, as two examples of graphene materials for electrodes.

FIG. 5 (A) the magnitudes of temperature increase in the ceramic capacitors (ceramic layer from $CaTiO_3$—$La_2O_3$—$TiO_2$ and Ni electrode or electrode containing Ni-20% exfoliated graphite) caused by internal heat generation at various different applied voltage values; (B) the temperature increases in the ceramic capacitors of the same compositions, except that the metal electrode is Cu-based (Cu only or Cu+20% exfoliated graphite).

DESCRIPTION OF THE PREFERRED EMBODIMENTS

The present invention provides a ceramic capacitor comprising at least a dielectric ceramic layer and at least a graphene electrode layer or an exfoliated graphite electrode deposited on the ceramic layer. The graphene electrode layer consists of a graphene material and/or a graphene composite material. The graphene material may contain a single-layer graphene (one graphene plane) or multi-layer graphene (2-300 graphene planes bonded together through van der Waals forces; up to 100 nm in thickness, but preferably <20 nm and further preferably <10 nm in thickness). If there are 2-10 graphene planes in a graphene sheet or platelet, this is called a few-layer graphene. Most preferably, the graphene material contains single-layer or few layer versions of either pristine graphene or non-pristine graphene, or both. The invention does not include an electrode comprising a neat metal layer not containing internally dispersed discrete graphene sheets. The graphene electrode layers are in direct contact with or bonded to a dielectric ceramic layer. This is essential to achieving the desired effects of the graphene electrode on the properties of the ceramic capacitor (e.g. dissipating self-generated heat in the capacitor and reducing or eliminating diffusion of metal atoms from the electrode to the dielectric layer.

Figure 2A:
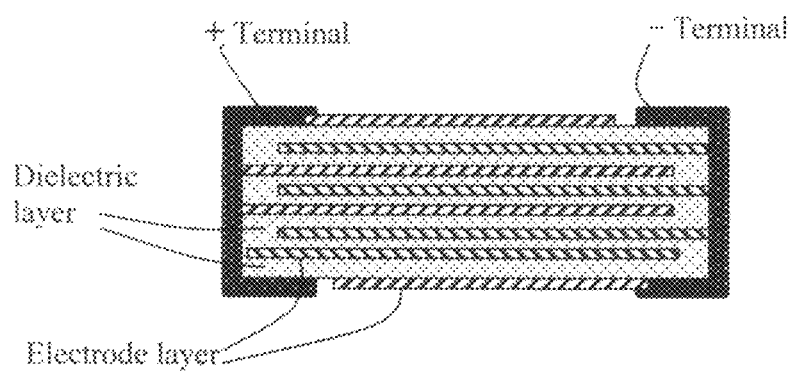
FIG. 2 (A) Schematic of a multi-layer chip ceramic capacitor; (B) a ceramic disc capacitor (a view with top portion of the protective coating removed).
Figure 2B:
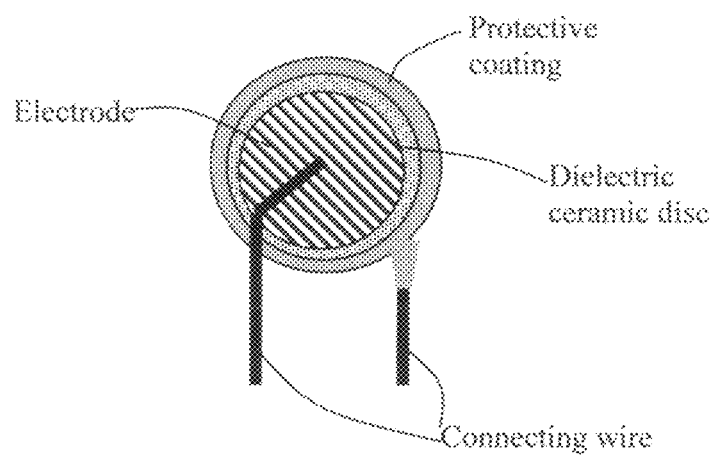

Two examples of ceramic capacitors, multi-layer chip ceramic capacitor (MLCC) and ceramic disc capacitor, are illustrated in FIG. 2(A) and FIG. 2(B), respectively. For each dielectric ceramic layer there are two electrodes in physical and electronic contact with one of the two primary surfaces of the dielectric layer. One electrode is connected to a positive terminal or connecting wire and the other electrode to a negative terminal or connecting wire. In a conventional ceramic capacitor, the electrode is made of a metallic material (metal or metal alloy).

In the present invention, a graphene electrode (graphene or graphene composite) or exfoliated graphite electrode (exfoliated graphite flakes or exfoliated graphite composite) is used to replace the metallic electrode. This strategy was found to surprisingly overcome many of the deficiencies or drawbacks of the conventional ceramic capacitors.

Figure 3:
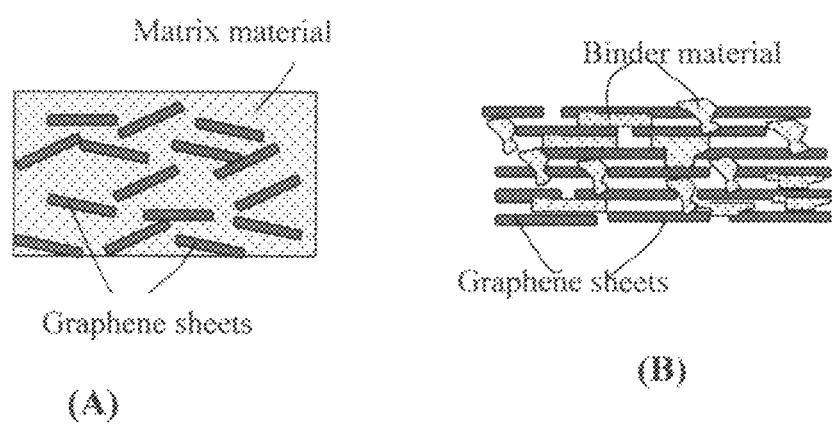
FIG. 3 (A) Schematic of a graphene composite composed of discrete graphene sheets dispersed in a matrix material.

The graphene composite material preferably contains at least 0.1% by weight (more preferably at least 2%, further preferably at least 5% by weight, and even more preferably at least 30% by weight) of multiple sheets of a graphene material selected from (a) a plurality of single-layer or multi-layer pristine graphene sheets (those having less than 0.01% by weight of non-carbon elements), or (b) a plurality of single-layer or multi-layer non-pristine graphene sheets (up to 100 nm or 300 graphene planes) having at least 0.01% by weight of non-carbon elements. These multiple graphene sheets are dispersed in a matrix material (schematically illustrated in FIG. 3(A)) or bonded by a binder material (FIG. 3(B)). It may be noted that, in the latter case (FIG. 3(B)), these multiple graphene sheets are bonded by a binder material (e.g. adhesive or glue resin) to form a layer. In the former case (FIG. 3 (A)), the matrix material, by definition of a matrix, forms a continuous phase with discrete graphene sheets dispersed and embedded in the bulk of the matrix material. The binder or matrix material is selected from a metal, carbon, graphite, polymer, pitch, glass, metal oxide, ceramic, or a combination thereof.

The non-pristine graphene is selected from graphene oxide (having an oxygen content of typically 0.01% to 50% by weight), reduced graphene oxide (typically less than 2% by weight of oxygen), graphene fluoride (typically from 0.01% to 30% by weight of fluorine), graphene chloride (typically from 0.01% to 30% by weight of chlorine), graphene bromide (typically from 0.01% to 30% by weight of bromine), graphene iodide (typically from 0.01% to 30% by weight of iodine), hydrogenated graphene (typically from 0.01% to 10% by weight of hydrogen), nitrogenated graphene (typically from 0.01% to 30% by weight of nitrogen), doped graphene (e.g. up to 10% B), chemically functionalized graphene (e.g. containing functional groups, such as amine, alkyl, hydroxyl, carboxylic, or epoxide), or a combination thereof. The non-carbon elements may include an element selected from oxygen, fluorine, chlorine, bromine, iodine, nitrogen, hydrogen, boron, or a combination thereof.

The exfoliated graphite electrode can contain discrete graphite flakes having a thickness from 100 nm to 1 μm, but preferably from 100 nm to 200 nm. The exfoliated graphite electrode can consist of an exfoliated graphite composite material composed of 0.1%-99% by weight (preferably at least 0.5% by weight) of discrete graphite flakes (having a thickness from 100 nm to 1 μm) that are bonded by a binder material or dispersed in a matrix material wherein the binder or matrix material is selected from a metal, carbon, graphite, polymer, pitch, glass, metal oxide, ceramic, organic material, or a combination thereof.

There are three classes of ceramic capacitors that can all benefit from the presently invented graphene electrode: Class 1 ceramic capacitors offer high stability and low losses for resonant circuit applications. Class 2 ceramic capacitors offer high volumetric efficiency for smoothing, by-pass, coupling and decoupling applications. Class 3 ceramic capacitors are barrier layer capacitors which are not standardized anymore.

Class 1 ceramic capacitors are known to be accurate, temperature-compensating capacitors, which offer the most stable voltage, temperature, and frequency. They have the lowest losses and, hence, are well suited for resonant circuit applications where stability is essential or where a precisely defined temperature coefficient is required; e.g., in compensating temperature effects for a circuit. The basic materials of class 1 ceramic capacitors are made from a mixture of fine particles of paraelectric materials, such as titanium dioxide ($TiO_2$), modified by additives containing Zinc, Zirconium, Niobium, Magnesium, Tantalum, Cobalt and Strontium. These additives are added to achieve the capacitor's desired linear characteristics. Specific examples of additives are $MgNb_2O_6$, $ZnNb_2O_6$, $MgTa_2O_6$, $ZnTa_2O_6$, $(ZnMg)TiO_3$, $(ZrSn)TiO_4$, and $Ba_2Ti_9O_{20}$.

Class 2 ceramic capacitors exhibit temperature-dependent capacitance. The ceramic dielectric is characterized by a nonlinear change of capacitance over the temperature range. The capacitance value also depends on the applied voltage. Class 2 ceramic capacitors have a dielectric with a high permittivity and therefore a better volumetric efficiency than class 1 capacitors, but lower accuracy and stability. They are suitable for bypass, coupling and decoupling applications or for frequency discriminating circuits where low losses and high stability of capacitance are less important. Class 2 capacitors are made of ferroelectric materials, such as barium titanate (BaTiO3), and suitable additives such as aluminum silicate, magnesium silicate and aluminum oxide. Other examples of ferroelectric materials include Colemanite, Europium barium titanate, Germanium telluride, Langbeinites, Lead scandium tantalate, Lead titanate, Lead zirconate titanate (PZT), Lead lanthanum zirconate titanate (PLZT), Lithium niobate, Potassium sodium tartrate, Potassium titanyl phosphate, Polyvinylidene fluoride (PVDF), and other Ferroelectric polymers.

These ceramics have high to very high permittivity (100 to 14,000), which depends on the field strength. Hence the capacitance value of class 2 capacitors is nonlinear and depends on temperature and voltage applied. Additionally class 2 capacitors can age over time. However, the high permittivity supports high capacitance values in small devices. Class 2 capacitors are significantly smaller than class 1 devices at the equal rated capacitance and voltage. They are suitable for applications that require the capacitor to maintain only a minimum value of capacitance, for example, buffering and filtering in power supplies and coupling and decoupling of electric signals.

In a preferred embodiment, the graphene electrode material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

Figure 1A:
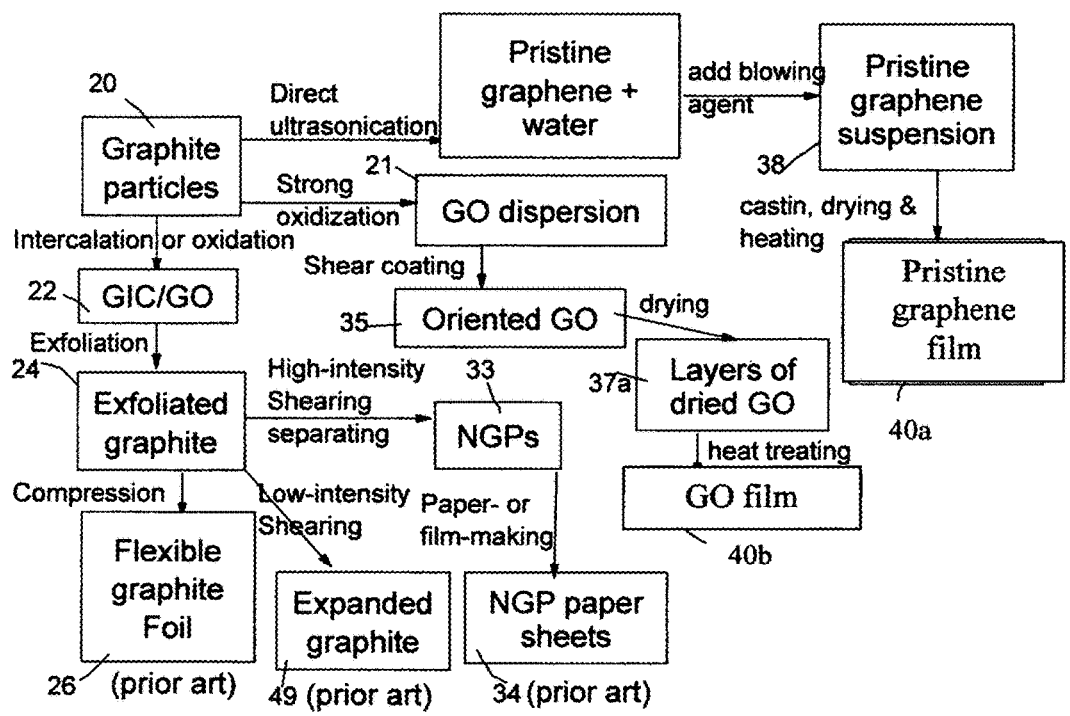
FIG. 1 (A) A flow chart illustrating various prior art processes of producing exfoliated graphite products (flexible graphite foils and expanded graphite flakes), along with a process for producing pristine graphene foam 40a or graphene oxide foams 40b; (B) Schematic drawing illustrating the processes for producing conventional paper, mat, film, and membrane of simply aggregated graphite or NGP flakes/platelets. All processes begin with intercalation and/or oxidation treatment of graphitic materials (e.g. natural graphite particles).
Figure 1B:
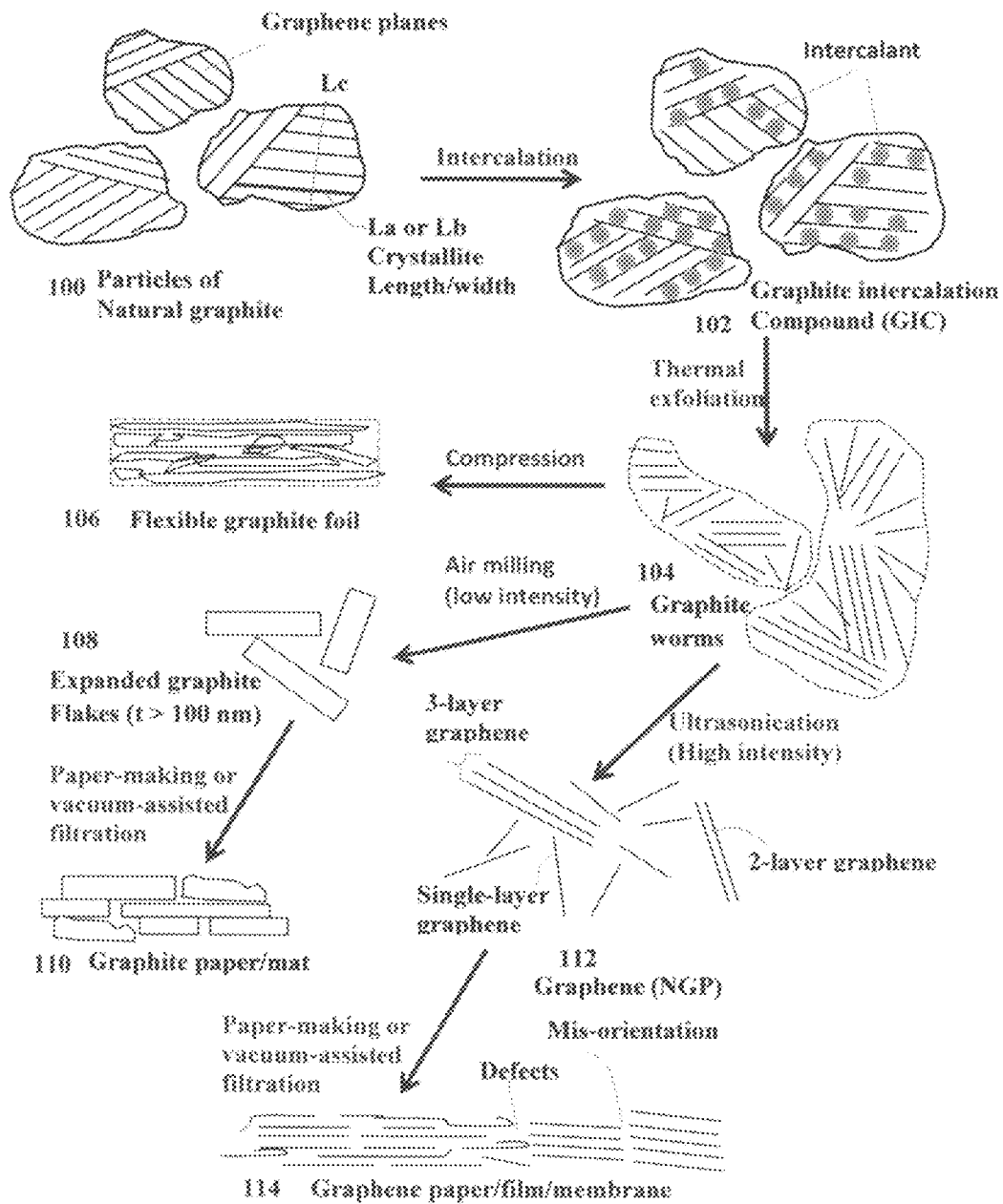

In one process, graphene materials are obtained by intercalating natural graphite particles with a strong acid and/or an oxidizing agent to obtain a graphite intercalation compound (GIC) or graphite oxide (GO), as illustrated in FIG. 1(A) (process flow chart) and FIG. 1(B) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 1(A) and 100 in FIG. 1(B)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (24 or 104), which are each a collection of exfoliated, but largely unseparated graphite flakes that remain interconnected.

In Route 1A, these graphite worms (exfoliated graphite or "networks of interconnected/non-separated graphite flakes") can be re-compressed to obtain flexible graphite sheets or foils (26 or 106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (49 or 108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper (34) using a paper-making process.

Route 2 entails ultrasonicating the graphite oxide suspension for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%40% by weight, more typically 0.01%-5% by weight, most typically and preferably less than 2% by weight.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

A process for producing a large-area monolithic graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. Such an excessively thin graphene (<2 nm) is not a good choice as an electrode for the presently invented ceramic capacitor unless the ceramic capacitors are meant to be ultra-small in the thickness direction, and ultra large in length and/or width. Furthermore, the CVD graphene films are extremely expensive. The graphene material produced by CVD is pristine graphene, which can be prepared in a large film (e.g. continuous-length entity) in a roll-to-roll fashion.

Alternatively and preferably, pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

The upper left portion of FIG. 1(A) shows a flow chart that illustrates the prior art processes used to fabricate flexible graphite foils. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 2.

In one prior art process, the exfoliated graphite (or mass of graphite worms) is re-compressed by using a calendaring or roll-pressing technique to obtain flexible graphite foils (26 in FIG. 1(A) or 106 in FIG. 1(B)), which are typically 100-300 µm thick. In another prior art process, the exfoliated graphite worm 24 may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide, 33 in FIG. 1(A)) may be made into a graphene film/paper (34 in FIG. 1(A) or 114 in FIG. 1(B)) using a film- or paper-making process.

Further alternatively, with a low-intensity shearing, graphite worms tend to be separated into the so-called expanded graphite flakes (108 in FIG. 1(B) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes. A matrix material may be impregnated into the porous paper mat structure to form an exfoliated graphite composite.

The starting material for all MLCC chips is a mixture of minute particles (typically from 10 nm to 20 µm) of paraelectric and/or ferroelectric materials and additives. As illustrated schematically in FIG. 2(A), the metallic electrodes of the capacitor can be deposited on the ceramic dielectric layer by metallization (e.g. metal vapor deposition, metal melt spraying, etc.). For an MLCC, electrode layers and ceramic layers are stacked alternatingly, one on another. The surfaces of the electrodes (metal-, graphene-, or exfoliated graphite-based) at both sides of the body are connected with a contacting terminal, which is a metallic material (e.g. metal or metal alloy). A lacquer, resin, or ceramic coating is then applied to protect the capacitor against moisture and other ambient species.

In a typical production process, a thin ceramic foil is cast from a suspension of the mixture powder and a binder. This foil is cut into equal-sized sheets, which are screen printed with a metal paste. These sheets become the electrodes. In an automated process, these sheets are stacked in the required number of layers and solidified under pressure. The electrodes are stacked in an alternating configuration, slightly offset from the adjoining layers so that they each can later be connected on the offset side, one on the left and the other on the right. The layered stack is pressed and then cut into individual components.

After cutting, the binder is burnt and removed from the stack, which is then sintered at temperatures between 1,200 and 1,450° C., producing a crystalline ceramic structure. This burning and sintering process creates the desired dielectric properties. This is followed by cleaning and then metallization of both end surfaces. Through the metallization, the ends and the inner electrodes are connected in parallel and the capacitor gets its terminals. The relative permittivity, the size and number of layers determines the final capacitance value of the capacitor.

A ceramic disc capacitor is manufactured by coating a ceramic disc with metallic electrodes (e.g. silver contacts), graphene compositions, or exfoliated graphite flakes on both sides. Two connecting wires are attached (e.g. soldered) to the two respective electrodes. A protective coating is then applied to seal the configuration, but allowing the connecting wires to feed through the protective coating. Ceramic disc capacitors typically have a capacitance value of 10 pF to 100 µF with a wide variety of voltage ratings, between 16 volts to 15 kV and more.

In one embodiment of the present invention, the graphene electrode can be made into a layer of thin graphene film or paper using spraying (e.g. electrostatic spraying, ultrasonic spraying, compressed air-assisted spraying, etc.), printing (e.g. screen printing, inkjet printing, etc.), casting, coating, paper-making, etc. Multiple graphene sheets or platelets, along with any desired additives or an optional binder or matrix material, can be dispersed in a liquid medium to form a suspension or ink, which is then dispensed and deposited directly onto a surface of a dielectric ceramic layer. The suspension or ink is then dried, allowing discrete sheets of graphene material to adhere with one another and adhere directly onto the dielectric ceramic layer.

One may also deposit the suspension or ink onto a solid substrate first, which is followed by drying to form a monolithic graphene layer (paper or film) and optionally heat treated to improve the crystal structure and physical properties of the graphene film. A piece of such a graphene film or paper is then attached to a dielectric ceramic layer with or without using glue (thin adhesive coating between the graphene film/paper and the dielectric ceramic layer, prior to or after ceramic layer sintering). The thickness of such a graphene layer is typically from 5 nm to 100 µm (preferably from 10 nm to 10 µm), but can be thinner or thicker, if so desired.

In another embodiment, the graphene electrode comprises a graphene composite material comprising multiple graphene sheets dispersed in a matrix material or bonded by a binder material. In yet another embodiment, the exfoliated graphite electrode comprises an exfoliated graphite composite material comprising multiple graphite flakes (having a thickness >100 nm) dispersed in a matrix material or bonded by a binder material. The graphene composite material or exfoliated graphite composite material can contain a binder or matrix material selected from a metal, carbon, graphite, polymer, pitch, glass, metal oxide, ceramic, or a combination thereof. In a preferred embodiment, the binder or matrix material is an electrically conductive material selected from an intrinsically conductive polymer, a metal, carbon, pitch, or graphite material.

In a particularly desired embodiment, the graphene composite material or exfoliated graphite composite contains from 0.1% to 30% by weight of a metal selected from Ag, Cu, Ni, Co, Mn, Fe, Zn, Sn, Pb, or a combination thereof, based on the total composite material weight. The composite material can contain a metal and an adhesive resin each of 0.1% to 30% by weight based on the total graphene or exfoliated graphite composite material weight. This amount of metal may be part of the binder or matrix material. Alternatively, this metal can be added as a modifier additive. We have surprisingly found this amount of metal (even as low as 0.1%) to be capable of facilitating soldering or welding between the graphene electrode (or exfoliated graphite electrode) and the connecting wires of the ceramic capacitor. The metal content in a graphene or exfoliated graphite composite can exceed 30% and, although not preferred, can be as high as 95% by weight.

There is no limitation as to how multiple sheets (or platelets) of a graphene material (or exfoliated graphite flakes) and a binder or matrix material (along with optional additives) are combined and consolidated to form an electrode layer. In one embodiment, multiple sheets of a graphene or exfoliated graphite material and a binder or matrix material (along with optional additives), initially all in a solid state, are properly blended to form a solid mixture. The mixture is then heated so that the binder or matrix material becomes a liquid or melt, which is then solidified or cured (hardened), optionally under a stress (e.g. pressure) or in a mold or tool. Alternatively, multiple sheets of a graphene material (along with optional additives) may be formed into a porous preform (e.g. a sheet of mat, paper, or foam), which is then infiltrated or impregnated with a binder or matrix material.

The dielectric layer (dielectric ceramic portion) of a ceramic capacitor may be made by using several processes; e.g. casting or coating, followed by sintering. Powder particles of a dielectric ceramic material may be added with a certain amount of additives, which are wet-mixed or granulated through a generally practiced procedure. The powder mixture is press-formed to a disc shape, and then sintered.

The dielectric ceramic element thus formed is provided at both main surfaces with a first electrode layer made of graphene by means of a printing method. In a normal practice, a graphene paste is screen-printed on both surfaces of the dielectric ceramic layer, and baked at a temperature from 100 to 1,000° C. A higher temperature may be required if the dielectric ceramic layer has not been previously sintered. In this case, the drying or consolidation of the graphene layer and sintering of the dielectric ceramic layer are conducted concurrently. If the graphene material used is non-pristine graphene, such as graphene oxide or graphene fluoride, thermal reduction of the graphene material also occurs simultaneously. Thus, sintering of ceramic, thermal reduction of graphene oxide or fluoride, and consolidation of the graphene layer are integrated into a single step. This is possible due to the chemical and physical nature of graphene materials (e.g., thermally stable and not vaporizable up to 3,200° C. in a non-oxidizing atmosphere). Such an advantage cannot be realized by a metal electrode.

The baking in the present case typically does not need to be conducted in the neutral or a reductive atmosphere; the baking is carried out in the normal atmospheric environment. The neutral atmosphere (e.g. in $N_2$ gas atmosphere) here means that, in this environment, neither oxidation nor reduction occurs.

Alternatively, the first electrode layer can be formed also by (a) a dip coating process where a dielectric ceramic element is immersed in a graphene paste, (b) an inkjet printing method, (c) a spraying method, (d) a painting method, etc.

We have studied a wide variety of dielectric ceramic materials and electrode materials, but only the following examples are used to illustrate some specific details about the best modes of practicing the instant invention. These examples should not be construed as limiting the scope of the invention.

Example 1: Preparation of Discrete Nano Graphene Platelets (NGPs) which are GO Sheets Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water.

The resulting suspension was then cast onto a glass surface using a doctor's blade to exert shear stresses, inducing GO sheet orientations. The resulting GO coating films, after removal of liquid, have a thickness that can be varied from approximately 5 to 500 μm (preferably and typically from 10 μm to 50 μm). The GO film is then heat-treated at a temperature of 100-1,000° C. to obtain reduced graphene oxide (RGO) film. The film was cut into small discs and a disc was bonded to each surface of a dielectric layer using an adhesive or simply via compressing.

Example 2: Preparation of Single-Layer Graphene Sheets from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. The suspension was then cast onto a glass surface using a doctor's blade to exert shear stresses, inducing GO sheet orientations. Several samples were cast, some containing a blowing agent and some not. The resulting GO films, after removal of liquid, have a thickness that can be varied from approximately 1 to 50 μm.

The several sheets of the GO film were then subjected to heat treatments that involve an initial (first) thermal reduction temperature of 80-500° C. for 1-5 hours. The graphene domains in the film can be further perfected (re-graphitized to become more ordered or having a higher degree of crystallinity and larger lateral dimensions of graphene planes, longer than the original graphene sheet dimensions due to chemical merging) if the film is followed by heat-treating at a second temperature of 1,500-2,850° C.

Example 3: Preparation of Pristine Graphene Film (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene film having a higher thermal conductivity. Pristine graphene sheets were produced by using the direct ultrasonication or liquid-phase production process. In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Example 4: Preparation of Graphene Oxide (GO) Suspension from Natural Graphite and of Subsequent GO Films Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 12-48 hours, the suspension or slurry appears to remains optically opaque and dark. Some amount of partially oxidized or intercalated graphite after 12 hours of chemical treatments was collected, washed, and dried to produce a graphite intercalation compound (GIC). This GIC was subjected to a thermal shock at 1,000° C. for 1 minute to obtain exfoliated graphite worms, which were then put into a blender to break up the graphite worms to obtain exfoliated graphite flakes.

After 48 hours of chemical treatments, the remaining reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%. An amount of the suspension was dried to recover GO powder, which was later mixed with several different matrix materials to make graphene composites.

The remaining amount was made into films. By dispensing and coating the GO suspension on a polyethylene terephthalate (PET) film in a slurry coater and removing the liquid medium from the coated film we obtained a thin film of dried graphene oxide. Several GO film samples were then subjected to different heat treatments, which typically include a thermal reduction treatment at a first temperature of 100° C. to 500° C. for 1-10 hours, and at a second temperature of 1,500° C.-2,850° C. for 0.5-5 hours. With these heat treatments the GO films were transformed into graphene films.

Example 5: Preparation of Graphene Electrode Layers from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Upon casting on a glass surface with the solvent removed, the dispersion became a brownish film formed on the glass surface. GF films can be heat-treated to remove a desired amount of fluorine to obtain lightly fluorinated graphene film electrodes.

Example 6

Preparation of Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene-to-urea mass ratios of 1:0.5, 1:1 and 1:2 are designated as NGO-1, NGO-2 and NGO-3 respectively and the nitrogen contents of these samples were 14.7, 18.2 and 17.5 wt %, respectively as determined by elemental analysis. These nitrogenated graphene sheets remain dispersible in water. The resulting suspensions were then cast, dried, and heat-treated initially at 200-350° C. as a first heat treatment temperature (HTT) and subsequently treated at a second temperature of 1,500° C. The resulting nitrogenated graphene films exhibit physical densities from 0.45 to 1.28 g/cm3. The films can be roll-pressed to become solid films with a density from 1.8 to 2.25 g/cm3. Typical nitrogen contents of the films are from 0.01% (HTT=1,500° C.) to 5.3% (HTT=350° C.), depending upon the final heat treatment temperature involved. In additional samples, dried powder (sheets) of nitrogenated graphene was mixed with a matrix material to make a composite.

Example 7: Preparation of Dielectric Ceramic Layers and Ceramic Capacitors

To a 100 part (in weight) of the main constituent powder $CaTiO_3$—$La_2O_3$—$TiO_2$ (in mole ratio of $CaTiO_3$ 0.950, $La_2O_3$—$TiO_2$ 0.050), was added an additive, MgO for a 0.2 part and $SiO_2$ for a 0.2 part. These altogether were put into a ball mill containing 5 mm diameter balls of $ZrO_2$, and the materials were mixed for 24 hours at 100 rpm in the mill. After being filtered through a 150 mesh silk screen, the mixture was poured into a stainless steel tray lined with a Teflon bottom sheet, and was dried there at 1,200° C. The dried bulk is crushed in an alumina mortar, and then granulated. The granulated material was compression-formed into pieces of discs, which were sintered at approximately 1,350° C. to provide the dielectric ceramic layers.

Each dielectric ceramic layer is provided, at both of the main surfaces, with an electrode layer of graphene by means of a printing method. Connecting Al wires were soldered on the two graphene electrodes layers, and an epoxy resin-based protective coating was then applied to cover the entire structure of dielectric ceramic layers, with the connecting wires sticking out of this protective coating. Multi-layer chip ceramic capacitors were made in a similar manner, but dielectric layers and graphene electrode layers are alternately stacked and laminated together. The edges of positive electrodes are connected to a metal terminal plate and negative electrodes to another metal terminal plate as schematically illustrated in FIG. 2(A). For comparisons, we also prepared corresponding ceramic capacitors featuring metal electrodes (Zn, Cu, Ni, Ag, etc.).

Summarized in Table 1 below are representative performance data of several ceramic disc capacitors with comparable dimensions. The equivalent series resistance was measured by using electrical impedance spectroscopy technique.

TABLE 1

Performances of various ceramic capacitors with identical dimensions (dielectric loss measured at 1 KHz), equivalent series resistance at 1 MHz)

| Sample code | Electrode composition | Dielectric ceramic | Capacitance (nF) | Dielectric loss (%) | Equivalent series resistance, mΩ |
|---|---|---|---|---|---|
| 1-A | Zn | $CaTiO_3$—$La_2O_3$—$TiO_2$ + 0.2% MgO | 3.36 | 0.65% | 4.8 |
| 1-B | Zn + 0.1% RGO | $CaTiO_3$—$La_2O_3$—$TiO_2$ + 0.2% MgO | 3.55 | 0.54% | 4.4 |

TABLE 1-continued

Performances of various ceramic capacitors with identical dimensions (dielectric loss measured at 1 KHz), equivalent series resistance at 1 MHz)

| Sample code | Electrode composition | Dielectric ceramic | Capacitance (nF) | Dielectric loss (%) | Equivalent series resistance, mΩ |
|---|---|---|---|---|---|
| 1-C | Zn + 1% RGO | $CaTiO_3$—$La_2O_3$—$TiO_2$ + 0.2% MgO | 3.64 | 0.52% | 4.2 |
| 1-D | Zn + 10% RGO | $CaTiO_3$—$La_2O_3$—$TiO_2$ + 0.2% MgO | 3.82 | 0.52% | 3.5 |
| 2-A | Ag | $CaTiO_3$—$La_2O_3$—$TiO_2$ + 0.2% $SiO_2$ | 3.37 | 0.63% | 3.7 |
| 2-B | Ag + 10% pristine graphene | $CaTiO_3$—$La_2O_3$—$TiO_2$ + 0.2% $SiO_2$ | 3.82 | 0.51% | 3.4 |
| 2-C | Ag + 25% pristine graphene | $CaTiO_3$—$La_2O_3$—$TiO_2$ + 0.2% $SiO_2$ | 3.90 | 0.47% | 3.2 |
| 2-D | Ag + 50% pristine graphene | $CaTiO_3$—$La_2O_3$—$TiO_2$ + 0.2% $SiO_2$ | 3.95 | 0.44% | 3.0 |
| 2-E | Ag + 75% pristine graphene | $CaTiO_3$—$La_2O_3$—$TiO_2$ + 0.2% $SiO_2$ | 4.08 | 0.41% | 3.0 |
| 2-F | 100% pristine graphene | $CaTiO_3$—$La_2O_3$—$TiO_2$ + 0.2% $SiO_2$ | 4.11 | 0.38% | 3.0 |

The above data have demonstrated the following points:
1) A small amount of graphene material (e.g. reduced graphene oxide, RGO, or pristine graphene) added into a metal electrode can have significant impact on the performance of the resulting ceramic capacitors: significantly increased capacitance, reduced dielectric loss, and reduced equivalent series resistance (ESR). These are highly surprising results.
2) The capacitance of a ceramic capacitor is generally believed to be governed by the nature and sizes of the dielectric ceramic layer(s) and independent of the electrodes used. Contrary to this commonly accepted concept, these data have clearly shown very significant, unexpected results.
3) Not wishing to be bound by theory, but the applicant is of the opinion that the presence of some graphene material in the electrode could improve the interfacial contact or bonding between the dielectric layer and the electrode. This is supported by the observations that the equivalent series resistance (ESR) is reduced with the presence of graphene sheets. The ERS of a dielectric ceramic capacitor is caused by the sum of the internal resistance value of the dielectric ceramic layer, that of the electrode layers, and the impedance at the interfaces between the dielectric layer and the electrode layer. Although the electrical conductivity of graphene is greater than that of Zn, it is lower than that of silver (Ag). The observation that the ESR of the ceramic capacitors containing graphene-based or graphene-containing electrodes is still consistently lower than the ESR of the neat silver electrode-based capacitor indicates that the interfacial resistance plays a significant role.
4) Graphene also acts to facilitate or improve good interfacial contact between the electrode and the dielectric layer, thereby reducing the interface-induced dielectric loss.

Example 8: A Wide Variety of Dielectric Ceramic Layers from Barium Titanate, its Mixtures and Compounds with Other Metal Oxides As a representative example for dielectric ceramics, the production of barium titanate ceramic layers is described in some detail as follows. First, $BaCO_3$ and $TiO_2$ were prepared as the starting raw materials for the dielectric ceramic layers. The mixture was well-blended in a ball mill for mixing, and then subjected to calcination to obtain a composite oxide of a composition formula $Ba_{1.01}TiO_3$. This composite oxide was subjected to grinding to obtain a main constituent powder.

Subsequently, $Al_2O_3$ containing Al as the first auxiliary constituent, and $Fe_2O_3$ (or $FeO_{3/2}$), CoO, NiO, CuO, and ZnO as $MO_x$ containing the second auxiliary constituent M, and $Dy_2O_3$ containing Dy as the third auxiliary constituent R, were prepared. Then, 0.5 parts by mol of the $Al_2O_3$ (1.0 part by mol in terms of Al), 1.0 part by mol of the $Dy_2O_3$ (2.0 parts by mol in terms of Dy), 0.2 parts by mol of the MnO, and 1.0 part by mol of the $SiO_2$ were each weighed with respect to 100 parts by mol of the main constituent. Further, the $MO_x$ was weighed so that the content ratio of the second auxiliary constituent M to the Al fell within the range of 0.005 to 0.45. The main constituent and auxiliary constituents were again put along with PSZ balls and pure water into a ball mill for mixing, thereby providing a raw material powder.

Then, each type of raw material powder with a polyvinyl butyral based binder and ethanol as an organic solvent added thereto was subjected to wet mixing in a ball mill for the preparation of a ceramic slurry. The ceramic slurry was then subjected to sheet forming using a doctor's blade method to obtain ceramic green sheets. Upon subsequent heat treatments, the green sheets became dielectric elements having a thickness of 2.0 μm.

The preparation of other ferroelectric materials than Barium titanate ($BaTiO_3$), such as Colemanite, Europium barium titanate, Germanium telluride, Langbeinites, Lead scandium tantalate, Lead titanate, Lead zirconate titanate (PZT), Lead lanthanum zirconate titanate (PLZT), Lithium niobate, Potassium sodium tartrate, and Potassium titanyl phosphate, are well-known in the art. These materials can be readily made into thin sheets having a thickness from 20 nm to 10 μm.

Dielectric ceramic layers can also be made from a paraelectric material, such as titanium dioxide ($TiO_2$), aluminum silicate, magnesium silicate, aluminum oxide, $MgNb_2O_6$, $ZnNb_2O_6$, $MgTa_2O_6$, $ZnTa_2O_6$, $(ZnMg)TiO_3$, $(ZrSn)TiO_4$, and $Ba_2Ti_9O_{20}$, with or without a modifier containing Zinc, Zirconium, Niobium, Magnesium, Tantalum, Cobalt, or Strontium. The production of these materials into thin plate or disc forms can also be readily made using known processes.

Ceramic layers were then laminated with graphene electrodes or exfoliated graphite electrodes (containing 0-100% graphene or exfoliated graphite) to form ceramic capacitors using coating (or printing, etc.) and lamination processes, for instance. For comparison, metal electrodes (0% of graphene or exfoliated graphite), are incorporated into the ceramic capacitors. For instance, a conductive paste for electrodes was prepared which contained Ni, Cu, or Ag as a conductive component. Then, this conductive paste was used to carry out screen printing onto the ceramic green sheets, thereby forming a conductive layer in a predetermined shape on the ceramic green sheets. Then, a predetermined number of the ceramic green sheets with the conductive layers formed thereon were stacked in a predetermined direction to obtain a ceramic laminated body. This ceramic laminated body was heated at a temperature of about 400° C. to burn off and remove the binder, and then subjected to firing in a reducing atmosphere including an $H_2$—$N_2$ gas, thereby providing a ceramic body with internal electrodes buried therein. As an example for the firing condition for barium titanate-based dielectric layers, the firing was carried out under the firing conditions of a maximum temperature of 1,220° C., approximate oxygen partial pressure of $10^{-10}$ MPa, and firing time of 3 hours. In the case of Cu electrodes, a Cu containing conductive paste was prepared. The conductive paste was applied onto both sides of the ceramic body, and subjected to a baking treatment at a temperature of 800° C. Silver-based electrodes were similarly processed.

The ceramic capacitors were subjected to high voltage tests with the temperature rise being measured as an indication of the combined internal heat generation tendency and heat dissipation capability.

Figure 4A:
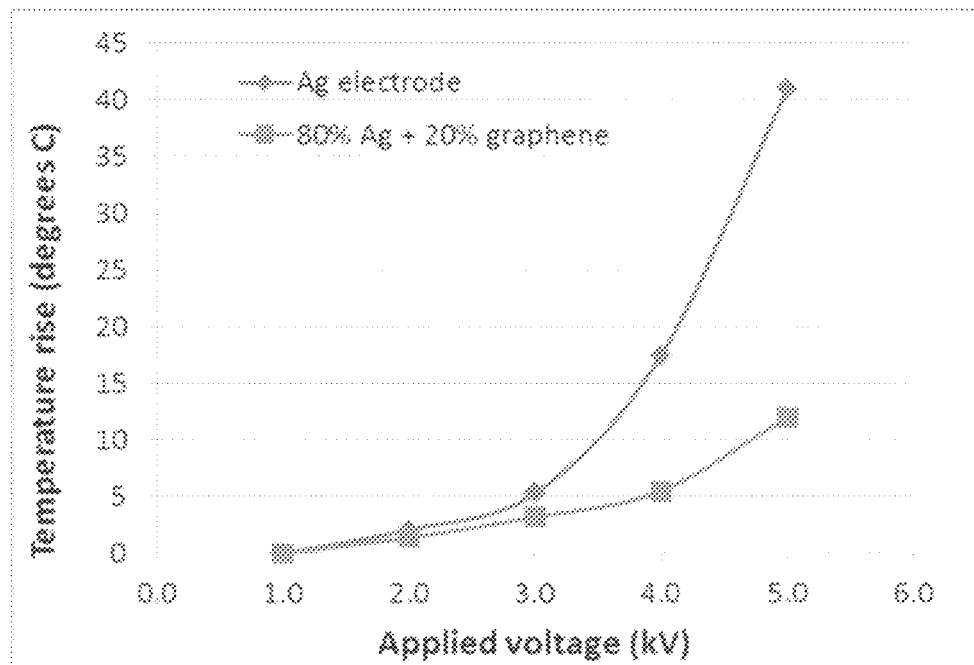
Figure 4B:
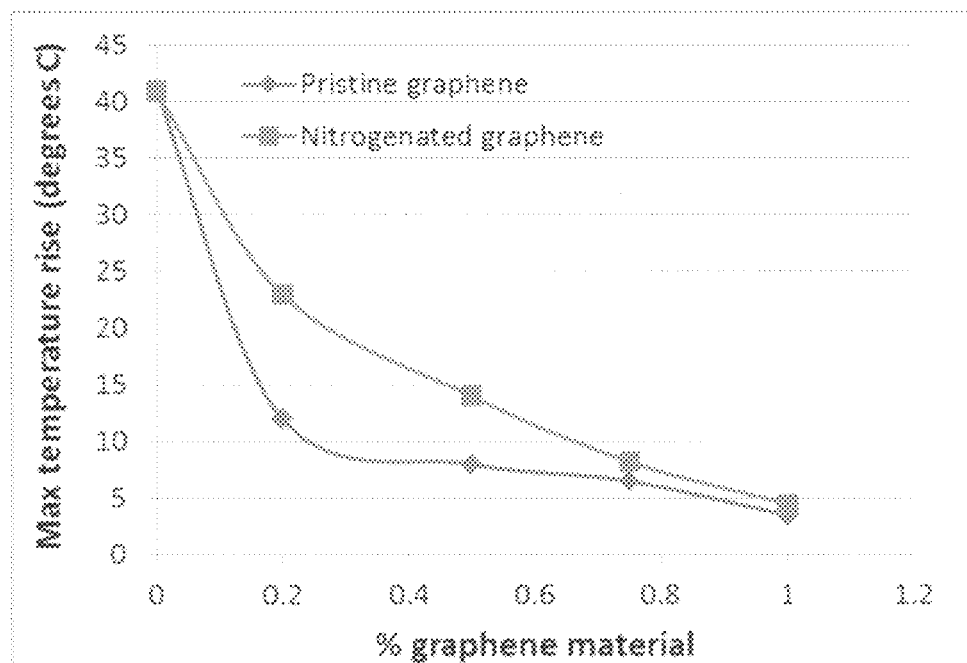

Shown in FIG. 4(A) are the magnitudes of temperature increase in the ceramic capacitors ($CaTiO_3$-based dielectric ceramic layer and Ag electrode or composite electrode containing Ag-20% pristine graphene) caused by internal heat generation at various different applied voltage values. These data indicate that the presence of 20% graphene leads to a dramatic reduction in the capacitor temperature. Such a benefit allows the ceramic capacitor to operate under a high applied voltage for a much longer life without a dielectric or thermal breakdown. FIG. 4(B) shows the temperature increases in the ceramic capacitors as a function of the graphene material proportion for two capacitors, one featuring various loadings of pristine graphene and the other nitrogenated graphene, as two examples of graphene materials for electrodes. Again, the presence of a graphene material results in a significantly lower capacitor operating temperature. The maximum temperature decreases with increasing proportion of the graphene material, either pristine graphene or nitrogenated graphene.

Figure 5A:
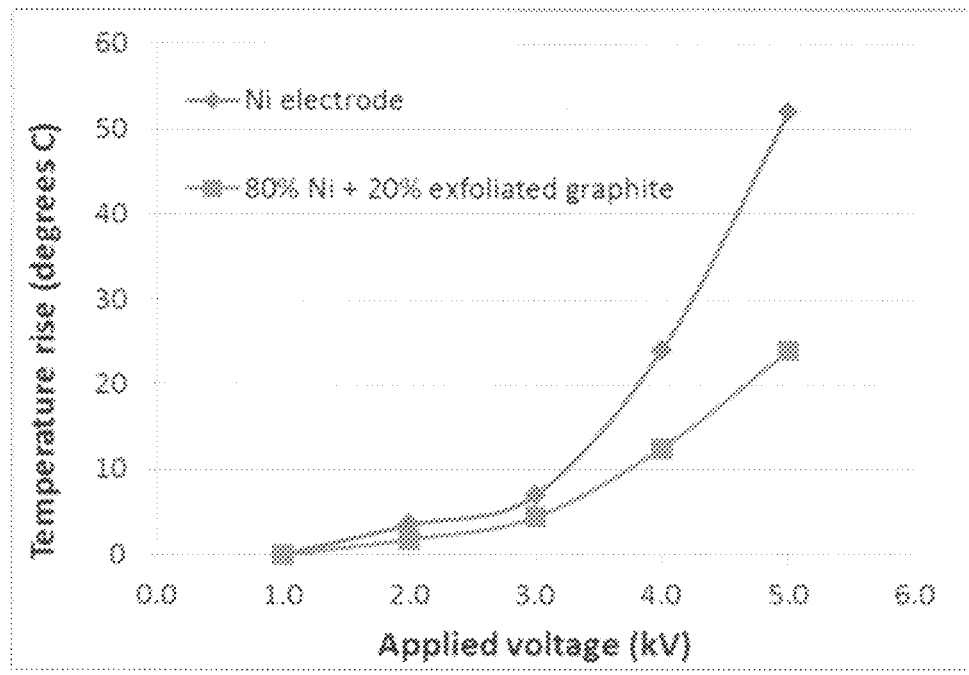
Figure 5B:
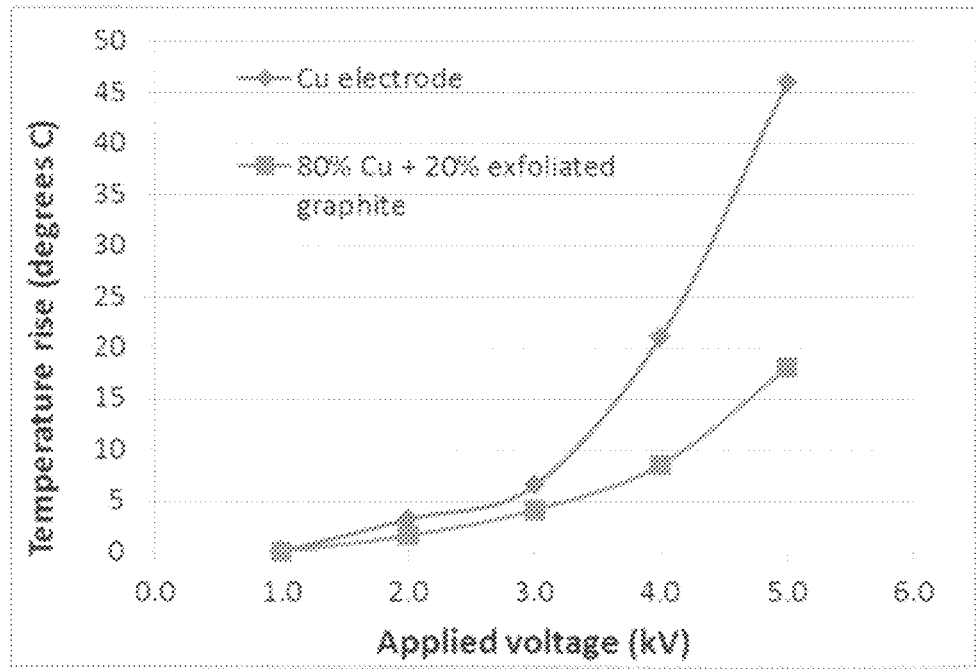

Shown in FIG. 5(A) are the magnitudes of temperature increase in the ceramic capacitors (ceramic layer from $CaTiO_3$—$La_2O_3$—$TiO_2$ and Ni electrode or electrode containing Ni-20% exfoliated graphite) caused by internal heat generation at various different applied voltage values. FIG. 5(B) shows the temperature increases in the ceramic capacitors of the same compositions, except that the metal electrode is Cu-based. These data demonstrate that the presence of exfoliated graphite flakes results in a significantly lower capacitor operating temperature. The maximum temperature decreases with increasing proportion of the exfoliated graphite amount.

After investigating a broad array of graphene material- and exfoliated graphite-based electrodes, in combination with a wide variety of dielectric ceramic materials (including paraelectric and ferroelectric ceramics), we have observed the following unexpected advantages:

The graphene material in small discrete sheets/platelets (0.3 μm-50 μm in length/width and 0.34 nm-100 nm in thickness) or exfoliated graphite flakes (>100 μm in thickness), stacked together to form an electrode layer (with or without a binder or matrix) imparts many unexpected benefits to a ceramic capacitor:

(a) reduced or eliminated electrode migration (e.g. small amount of single-layer graphene or few-layer graphene sheets can help prevent diffusion of metal atoms into the dielectric ceramic structure, causing premature breakdown, or into the interface zone between a lead wire and the metal electrode, weakening the soldering bond);

(b) good compatibility with soldering material and/or connecting wires (no diffusion or interface weakening issue; no thermal mismatch);

(c) no or little metal oxidation of electrode (both graphene and exfoliated graphite are highly resistant to oxidation and some graphene materials are actually very protective against metal oxidation if/when a metal exists in the electrode);

(d) simplified electrode compositions (surprisingly, graphene materials provide many desirable functions or features to the electrode, obviating the need to have complex electrode compositions);

(e) ease of electrode processing (molding of graphene-based or exfoliated graphite-based electrodes can be accomplished by using a broad array of industry-scale processes);

(f) improved compatibility with the dielectric material (improved contact between electrode and dielectric layer; also, the presence of graphene sheets, having high specific surface areas, has effectively constrained diffusion of metal atoms into the ceramic layer); and (g) reduced or eliminated heat accumulation in the capacitor during operations.

We claim:

1. A ceramic capacitor comprising at least a dielectric ceramic layer and at least an electrode layer deposited on said dielectric ceramic layer, wherein said electrode layer consists of a metal-free exfoliated graphite electrode layer being in direct contact with or bonded to said dielectric ceramic layer and does not contain a layer of neat metal or metal alloy and wherein said metal-free exfoliated graphite electrode layer has a thickness from 2 nm to 10 μm and consists of multiple discrete sheets of an exfoliated graphite material stacked together or an exfoliated graphite composite material containing from 0.1% to 99% by weight of multiple discrete sheets of an exfoliated graphite dispersed in a matrix material or bonded by a binder material to form said graphene electrode layer; and wherein said binder material or matrix material is selected from carbon, polymer, pitch, glass, metal oxide, ceramic, organic material, or a combination thereof.

2. The ceramic capacitor of claim 1, wherein said exfoliated graphite electrode contains discrete graphite flakes having a thickness from 100 nm to 1 μm, or consists of an exfoliated graphite composite material composed of 0.1% to 99% by weight of discrete graphite flakes having a thickness from 100 nm to 1 μm.

3. The ceramic capacitor of claim 1, wherein said graphene electrode layer has a thickness from 10 nm to 10 μm.

4. The ceramic capacitor of claim 1, wherein said binder or matrix material is an electrically conductive material selected from an intrinsically conductive polymer, carbon, pitch, or graphite material.

5. The ceramic capacitor of claim 1, which is a ceramic disc capacitor.

6. The ceramic capacitor of claim 1, which is a multi-layer ceramic chip capacitor comprising a plurality of dielectric ceramic layers and a plurality of graphene electrode layers alternatingly stacked with one another.

7. The ceramic capacitor of claim 1, wherein said graphene electrode layer has a thickness from 5 nm to 1 μm.

8. The ceramic capacitor of claim 1, wherein said dielectric ceramic layer contains a ferroelectric material selected from Barium titanate ($BaTiO_3$), Colemanite, Europium barium titanate, Germanium telluride, Langbeinites, Lead scandium tantalate, Lead titanate, Lead zirconate titanate (PZT), Lead lanthanum zirconate titanate (PLZT), Lithium niobate, Potassium sodium tartrate, Potassium titanyl phosphate, Polyvinylidene fluoride (PVDF), a Ferroelectric polymer, or a combination thereof.

9. The ceramic capacitor of claim 1, wherein said dielectric ceramic layer contains an additive selected from a paraelectric material, titanium dioxide ($TiO_2$), aluminum silicate, magnesium silicate, aluminum oxide, $MgNb_2O_6$, $ZnNb_2O_6$, $MgTa_2O_6$, $ZnTa_2O_6$, $(ZnMg)TiO_3$, $(ZrSn)TiO_4$, and $Ba_2Ti_9O_{20}$, a modifier containing Zinc, Zirconium, Niobium, Magnesium, Tantalum, Cobalt, or Strontium, or a combination thereof.

10. A ceramic capacitor comprising at least a dielectric ceramic layer and at least an electrode layer deposited on said dielectric ceramic layer, wherein said electrode layer consists of a graphene electrode layer or an exfoliated graphite electrode layer being in direct contact with or bonded to said dielectric ceramic layer and wherein said graphene electrode layer has a thickness from 2 nm to 10 μm and consists of a graphene composite material containing from 0.1% to 99% by weight of multiple discrete sheets of a graphene material that are all internally dispersed in a matrix material to form said graphene electrode layer; wherein said graphene material is selected from (a) single-layer or multi-layer pristine graphene sheets having less than 0.01% by weight of non-carbon elements or (b) single-layer or multi-layer non-pristine graphene sheets having from 0.01% by weight to 50% by weight of non-carbon elements; wherein said multi-layer pristine or non-pristine graphene sheets have a thickness less than 100 nm and said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof; and wherein said matrix material is selected from metals, a carbon, polymers, pitch, glass materials, metal oxides, ceramics, organic materials excluding binder materials, and combinations thereof.

11. The ceramic capacitor of claim 10, wherein said graphene composite material contains from 0.1% to 30% by weight of a metal selected from Ag, Cu, Ni, Co, Mn, Fe, Zn, Sn, Pb, or a combination thereof, based on the total graphene composite material weight.

12. The ceramic capacitor of claim 10, wherein said graphene composite material contains a metal and an adhesive resin each of 0.1% to 30% by weight based on the total graphene composite material weight.

13. The ceramic capacitor of claim 10, wherein said dielectric ceramic layer contains a ferroelectric material selected from Barium titanate ($BaTiO_3$), Colemanite, Europium barium titanate, Germanium telluride, Langbeinites, Lead scandium tantalate, Lead titanate, Lead zirconate titanate (PZT), Lead lanthanum zirconate titanate (PLZT), Lithium niobate, Potassium sodium tartrate, Potassium titanyl phosphate, Polyvinylidene fluoride (PVDF), a Ferroelectric polymer, or a combination thereof.

14. A ceramic capacitor comprising at least a dielectric ceramic layer and at least one composite electrode layer deposited on or bonded to said dielectric ceramic layer, wherein said composite electrode layer comprises a matrix or binder material and a mat, paper or foam comprising materials selected from: discrete exfoliated graphite flakes having a thickness from 100 nm to 1 μm; single-layer or multi-layer discrete pristine graphene sheets having less than 0.01% by weight of non-carbon elements; single-layer or multi-layer discrete non-pristine graphene sheets having at least 0.01% by weight of non-carbon elements; and combinations thereof, wherein the only binder material, matrix material or modifier additives are selected from the group containing discrete metal particles, carbon, polymer, pitch, glass, metal oxide, ceramic, organic material, and combinations thereof.

15. The ceramic capacitor of claim 14, wherein said binder or matrix material is an electrically conductive material selected from an intrinsically conductive polymer, carbon, or pitch material.

16. The ceramic capacitor of claim 14, wherein said graphene electrode layer has a thickness from 10 nm to 0.5 μm.

17. The ceramic capacitor of claim 14, wherein said dielectric ceramic layer contains an additive selected from a paraelectric material, titanium dioxide ($TiO_2$), aluminum silicate, magnesium silicate, aluminum oxide, $MgNb_2O_6$, $ZnNb_2O_6$, $MgTa_2O_6$, $ZnTa_2O_6$, $(ZnMg)TiO_3$, $(ZrSn)TiO_4$, and $Ba_2Ti_9O_{20}$, a modifier containing Zinc, Zirconium, Niobium, Magnesium, Tantalum, Cobalt, or Strontium, or a combination thereof.

* * * * *